(12) United States Patent
Best (10) Patent No.: US 7,086,377 B2
(45) Date of Patent: Aug. 8, 2006

(54) DUAL MODE FUEL INJECTOR

(75) Inventor: Christopher Howard Best, Maidstone (GB)

(73) Assignee: Ricardo Consulting Engineers Limited (GB)

( * ) Notice: Subject to any disclaimer, the term of this patent is extended or adjusted under 35 U.S.C. 154(b) by 10 days.

(21) Appl. No.: 10/362,265

(22) PCT Filed: Jul. 30, 2001

(86) PCT No.: PCT/GB01/03430

§ 371 (c)(1),
(2), (4) Date: Jul. 14, 2003

(87) PCT Pub. No.: WO02/18775

PCT Pub. Date: Mar. 7, 2002

(65) Prior Publication Data

US 2004/0055559 A1    Mar. 25, 2004

(51) Int. Cl.
F02M 45/08 (2006.01)
F02M 61/08 (2006.01)

(52) U.S. Cl. ............ 123/299; 123/294; 239/533.3; 239/533.9

(58) Field of Classification Search ............ 123/294, 123/299, 304, 305, 300; 239/5, 433, 584, 239/533.2–533.9, 443, 444

See application file for complete search history.

(56) References Cited

U.S. PATENT DOCUMENTS

| | | | | |
|---|---|---|---|---|
| 3,339,848 | A * | 9/1967 | Geiger | 239/453 |
| 4,022,165 | A * | 5/1977 | Eckert et al. | 123/300 |
| 4,202,500 | A * | 5/1980 | Keiczek | 239/533.3 |
| 4,215,821 | A * | 8/1980 | Eblen | 239/533.4 |
| 4,526,323 | A * | 7/1985 | Seifert | 239/533.9 |
| 4,546,739 | A * | 10/1985 | Nakajima et al. | 123/299 |
| 4,984,738 | A * | 1/1991 | Winquist | 239/88 |
| 5,458,292 | A * | 10/1995 | Hapeman | 239/533.4 |
| 5,899,389 | A * | 5/1999 | Pataki et al. | 239/533.2 |
| 5,996,558 | A * | 12/1999 | Ouellette et al. | 123/506 |
| 6,279,840 | B1 * | 8/2001 | Buckley | 239/533.4 |
| 6,758,407 | B1 * | 7/2004 | Lambert et al. | 239/5 |
| 6,769,634 | B1 * | 8/2004 | Brenk et al. | 239/533.3 |

FOREIGN PATENT DOCUMENTS

GB    2254886    * 10/1992

* cited by examiner

*Primary Examiner*—T. M. Argenbright
(74) *Attorney, Agent, or Firm*—Brooks Kushman P.C.

(57) ABSTRACT

A dual mode fuel injector having first (15) and second (30) valve members. The valve members are actuatable independently of one another and are arranged to open in opposite directions. The valve members control the flow through first (18) and second (29) orifices, one of which injects the fuel at a narrow angle with respect to the injector axis, and the other of which injects the fuel at a wider angle with respect to this axis.

20 Claims, 6 Drawing Sheets

DUAL MODE FUEL INJECTOR

The present invention relates to a dual mode fuel injector.

It is well known that combustion systems with homogenous fuel/air mixtures produce extremely low levels of soot and hence offer the potential of achieving low levels of particulate emissions.

There have been attempts to run compression ignition (diesel engines) with at least a portion of the fuel injected early into the engine cycle in order to gain the advantage of the rapid and soot free combustion.

Many researchers agree that a dual mode of combustion is necessary to enable a practical embodiment of an engine whereby the full load charge remains heterogeneous for reasons of acceptable combustion. This requirement dictates that the nozzle spray holes and combustion chamber retain their current configuration if the engine performance is not to be degraded.

When exploring the requirements of early injection for the homogenous charge mixture it is clear that the same injection spray holes are inappropriate. This is due mainly, but not exclusively, to their orientation which would lead to fuel impingement on the cylinder wall for injections where the piston is substantially away from the top dead center position when the charge air pressure is low. Such fuel impingement has disastrous effects on piston ring lubrication often leading to rapid seizure. Even if this could be overcome, there are additional disadvantages in terms of hydrocarbon emissions and lubricating oil dilution.

Several dual mode fuel injectors are known in the prior art.

For example, U.S. Pat. No. 5,458,292 discloses a dual mode fuel injector which provides a primary fuel flow and a secondary fuel flow to supplement the primary fuel flow at higher engine power. However, both fuel flows are arranged to inject fuel close to top dead center in the conventional manner and therefore have orifices which are directed generally towards the cylinder walls. For this reason this arrangement would be unsuitable for injecting fuel early. A similar arrangement is disclosed in EP-A-0 470,348.

An alternative arrangement is shown in U.S. Pat. No. 4,205,790. In this case, however, it is not possible to lift the outer valve member to expose the outer orifices without also lifting the inner valve to expose the inner orifice. Again, this design is suitable for varying the amount of fuel injected from cycle to cycle depending upon the engine load rather than injecting fuel at different times during a single cycle.

Therefore, there is no dual mode fuel injector in the prior art which is suitable for injecting a charge of fuel early in the engine cycle and also for injecting the ignition charge of fuel towards top dead center later in the same cycle.

According to the present invention, there is provided a dual mode fuel injector having a main axis and comprising a first fuel path and a first axially movable valve member for controlling the injection of fuel from the first fuel path through a first orifice; and a second fuel path and a second axially movable valve member within the first valve member for controlling the injection of fuel from the second fuel path through a second orifice; wherein the first and second valve members are actuatable independently of one another and the second valve member is arranged to open in a direction opposite to the direction of opening of the first valve member; and wherein one orifice is arranged to direct fuel at a narrow angle with respect to the axis and the other orifice is arranged to direct fuel at a larger angle with respect to the axis.

With this arrangement, as the values are actuatable independently, it is possible to control the injector to inject through one orifice or another at different times within a single stroke. Thus, when the piston is towards the lower part of its stroke, fuel can be injected through the orifice which injects at a narrow angle, such that, even towards bottom dead center, fuel is directed towards the piston and does not impinge on the cylinder wall. As the piston rises up the cylinder, this fuel which has been injected is entrained within the swirling air within the cylinder and generates a homogenous fuel/air mixture. Towards the top of the piston stroke, the ignition charge of fuel is injected and combustion is initiated in the combustion chamber in which the homogenous air/fuel mixture is already present thereby generating efficient and complete combustion. The opening of the valves in opposite directions facilitates the seating of the valves and hence improves the isolation of the two fuel paths.

The current preference is for the first orifice to be the one which is arranged to direct fuel at the narrow angle. With this arrangement it is preferable for the first valve to be arranged to open in the direction of fuel injection so that isolating the first and second fuel paths is simple. A first orifice may be provided by a number of discrete orifices. However, it is preferable for the first orifice to be an annular orifice which surrounds the first valve member. Further, the actuating means for the first and second valve members can be a fluid balanced system.

Another drawback of the prior art is that actuation of the valve members is triggered by the fuel to be injected. In other words, once the fuel to be injected reaches a certain pressure, it is impossible to prevent the valve members from opening. According to a preferred aspect of the present invention, the opening of the first and/or second valve members is controllable independently of the pressure of the fuel to be injected. This allows the pressure of the fuel to be injected to be raised to a level at which it would normally be injected, but for the valve members to be held closed to prevent injection. This provides flexibility in the control of the operation of the fuel injector. The operation of the fuel injector independently of the injection pressure is particularly useful when applied in conjunction with the fluid balanced system as referred to above.

Under these circumstances, the first valve member is preferably biased closed by a combination of a resilient element and fluid pressure acting on a piston mounted to the first valve member, the first valve member being arranged to be opened by the application of fluid pressure to the side of the first piston furthest from the first orifice; the second valve member being biased closed by a combination of pressure from a second resilient member and fluid pressure acting on a second piston and being arranged to be opened by the reduction of fluid pressure on the side of the second piston remote from the second orifice.

The actual value of the narrow angle is dependent on dimensions of the engine such as the length of the stroke and the diameter of the piston bowl. However, it is preferably less than 25°, more preferably less than 20° and most preferably less than 10° with respect to the axis.

The present invention also extends to an engine management system for an engine having a plurality of pistons each having a piston bowl and being arranged to reciprocate in a respective cylinder, the system comprising a respective dual mode fuel injector associated with each piston, and a control system, the control system arranged to operate such that when a piston is towards the bottom of its stroke, a first charge of fuel is injected towards the piston bowl, and when the piston is towards the top of its stroke, a second charge of fuel is injected into the cylinder at a wider angle than the first charge of fuel. This engine management system is able to provide the efficient combustion referred to above.

The fuel injector may be connected to a common rail source in which case the pressure of both charges of fuel will be substantially similar. Alternatively, the injector may be connected to a "jerk" or to a cam based fuel injection system such as an Electronic Unit Injector (EUI) or an Electronic Unit Pump (EUP). With EUI or EUP systems, fuel is supplied from a supply cylinder from which it is displaced by a plunger which is arranged to reciprocate within the supply cylinder, the plunger being displaced by a camshaft. One problem with such arrangement is that because fuel is injected twice in a single cycle, it may be difficult to manufacture the necessary double cam profile on the camshaft. Therefore, preferably, the camshaft is provided with two cam lobes positioned away from one another, and wherein the control system is arranged to open the first and second valve members only for every other rotation of the camshaft. Using this arrangement, a single dual lobe cam may be used, with a suitable control valve, to inject fuel alternatively through to different nozzles.

Also, preferably, the control system is arranged such that the first and/or second valve members are only opened for a selected portion of the cam profile. This allows greater control over the injection profile.

The invention also extends to an engine having a plurality of pistons each having a piston bowl and being arranged to reciprocate in a respective cylinder, the engine having an engine management system as described above.

A further aspect of the present invention is a method of injecting fuel into the cylinder of an internal combustion engine in which a piston with a piston bowl is arranged to reciprocate, the method comprising the steps of injecting one charge of fuel towards the piston bowl when the piston is towards the bottom of its stroke and injecting another charge of fuel at a wider angle into the cylinder when the piston is towards the top it its stroke.

During normal operation, the one charge of fuel represents the majority of fuel injected during the cycle. However, during start-up, it can be advantageous for the another charge of fuel to represent the majority of fuel injected during the cycle. This is because at cold start an HCCI (Homogenous Combustion Compression Ignition) engine will probably be running as a conventional engine with fuel supplied at high pressure before the piston reaches top dead center. It can be an advantage to add a second quantity of fuel after this main charge. This second quantity of fuel will not add to the power output of the engine and will only burn in the exhaust system and more specifically in a catalyst or particulate trap close to the exhaust manifold of the engine. This will increase the temperature of the catalyst or trap significantly more rapidly than without this post injection. The trap or catalyst thus reaches the operating temperature required to reduce emissions more rapidly.

The invention is particularly applicable to a compression ignition (diesel) engine. In this case, the orifice through which the fuel is injected at a large angle is a plurality of holes arranged in a conical configuration about the axis. The invention is also applicable to a spark ignition engine. In this case, it is envisaged that the orifice through which the fuel is injected at a larger angle is one hole directed away from the axis, or more than one hole directed in substantially the same direction away from the axis.

An example of a dual mode fuel injector constructed in accordance with the present invention will now be described with reference to the accompanying drawings, in which.

Figure 1:
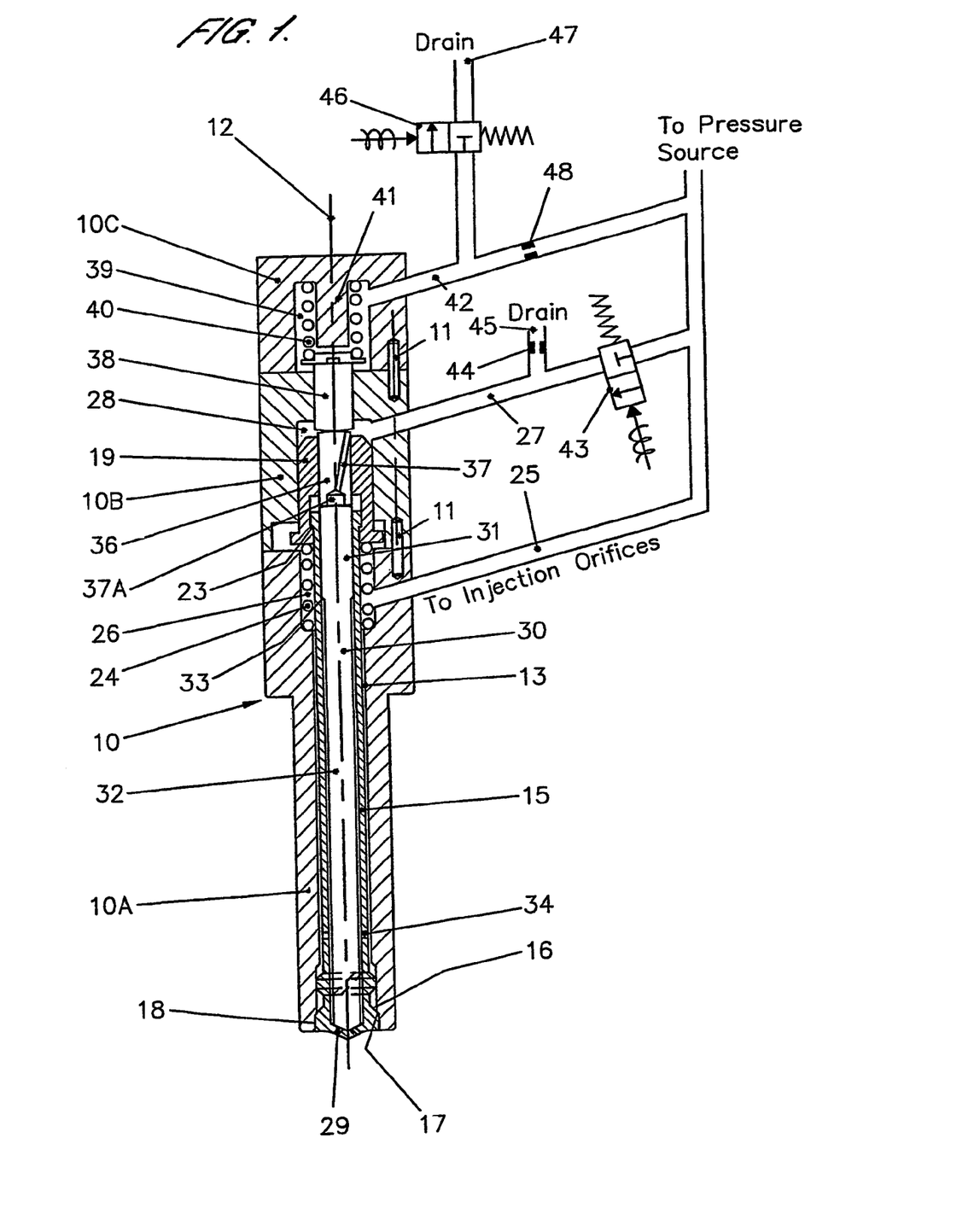
FIG. 1 is a schematic cross-section of the injector and its associated control system.

The dual mode fuel injector as shown in FIG. 1 comprises a main body 10 comprising three parts 10A, 10B and 10C connected end to end and aligned with respect to one another with alignment pins 11. The body 10 has a central main axis 12 along which a stepped bore 13 extends.

A first valve member 15 having a generally tubular configuration is provided within the stepped bore 13 towards the distal end of the injector. The valve member 15 is essentially a poppet valve which opens in the direction in which fuel is injected. The first valve member 15 has an outwardly flared frustoconical seating face 16 which sits on a seat 17 provided within the body 10. A small clearance 18 is provided between the valve element 15 and the body 10 at the distal end of the first valve member 15 so that, when the first valve member 15 is lifted from the seat 17, fuel can flow through the annulus between the first valve member and the body. The length and width of this clearance 18 can be tuned by known means to optimise both the spray path and trajectory.

Figure 3:
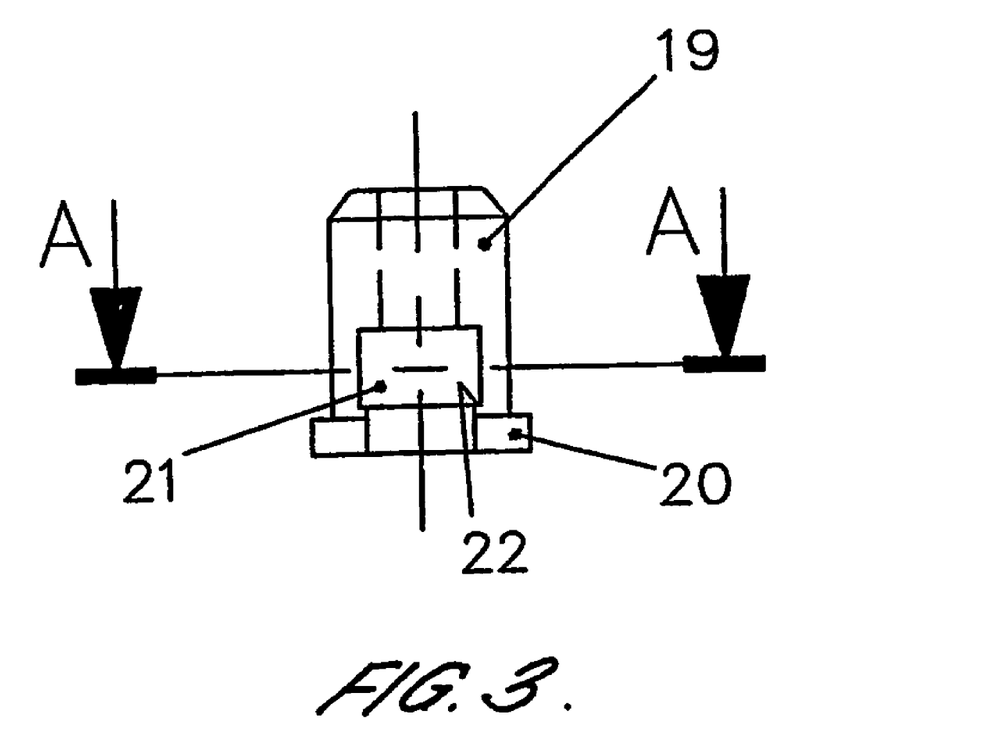
FIG. 3 is a side view of the piston attached to the second valve member.
Figure 3A:
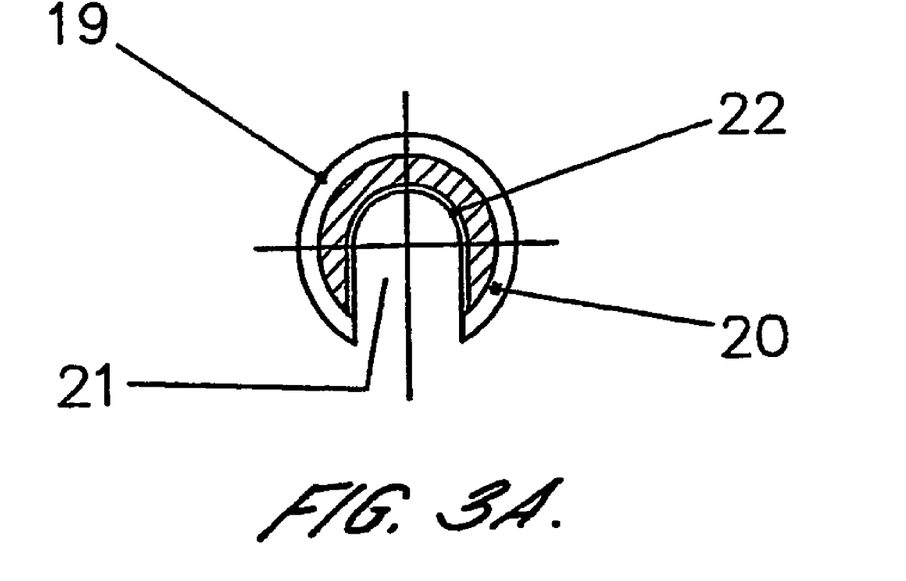
FIG. 3A is a cross-section through line A—A in FIG. 3.

At its proximal end, the first valve member 15 is rigidly fixed to a first piston 19 which is shown in greater detail in FIGS. 3 and 3A. The piston has a "top hat" configuration with a radially outwardly extending annular flange 20 at its distal end. A cut-out portion 21 extends from the distal end of the piston 19 along approximately half of its length. A proximally facing shoulder 22 is provided within the cut-out portion 21. This is arranged to be complementary with a distally facing shoulder 23 on the first valve member 15. This arrangement is provided to facilitate the assembly of the fuel injector. The first valve member 15 is inserted into the body 10 from the distal end. The arrangement of the cut-out 21 and shoulders 22, 23 allow the valve member to then be inserted into the piston 19 so that the shoulders 22, 23 engage with one another.

The piston 19 is positioned within the central section 10B of the body 10 so as to be slidable within the stepped bore 13. At its distal end, the piston is urged proximally by means of a first helical spring 24 and also by the application of fluid pressure along injection supply line 25 to first chamber 26 to act on the distal end of the piston 19. Opposed to this is the pressure supplied along second supply line 27 to second chamber 28 acting on the proximal end of the piston 19.

The distal end of the first valve member 15 is provided with a number of injection orifices 29 arranged in a conventional conical pattern. The second valve member 30 is a needle valve member which is slidably retained within an axial bore within the first valve member 15 so as to seat on a diameter outside of the orifices 29 thereby controlling the flow of fuel. The second valve member 30 has a larger diameter portion 31 at its proximal end and a smaller diameter portion 32 along the rest of its length separated by a frustoconical shoulder 33. A plurality of circumferentially distributed through holes 34 within the first valve member 15 are provided to communicate fluid pressure to an annulus defined between the first valve member 15 and the small diameter portion 32 of the second valve member 30. Alternatively to the through holes 34, the second valve member 30 can be provided with axially extending grooves around its proximal end. Fuel then flows down through these grooves and into the annulus between the first 15 and second 30 valve members.

At its proximal end, the second valve member 30 contacts a second piston 36 which is slidably retained within the first piston 19. A bore 37 extends along the length of the second piston 36 and terminates in a larger counterbore 37A in the proximal end of the second piston. At its proximal end, the second piston 36 abuts a third piston 38 of larger diameter than the second piston. The reason for the arrangement of the second valve member 30, second piston 36 and third piston 38 in abutment with one another is to allow for manufacturing tolerances in the various components. The third piston 38 is slidably retained within the bore 13 of the second section 10B of the body 10. The distal end of the third piston 38 extends into a third chamber 39 in which it is biased distally by a second helical spring 40. The third chamber 39 has a portion extending distally from its proximal end along the axis 12 to provide a stop 41 which limits the movement of the third piston 38 and hence the second valve member 30. A third supply line 42 is arranged to provide fluid at injection pressure to the third chamber 39.

Figure 4:
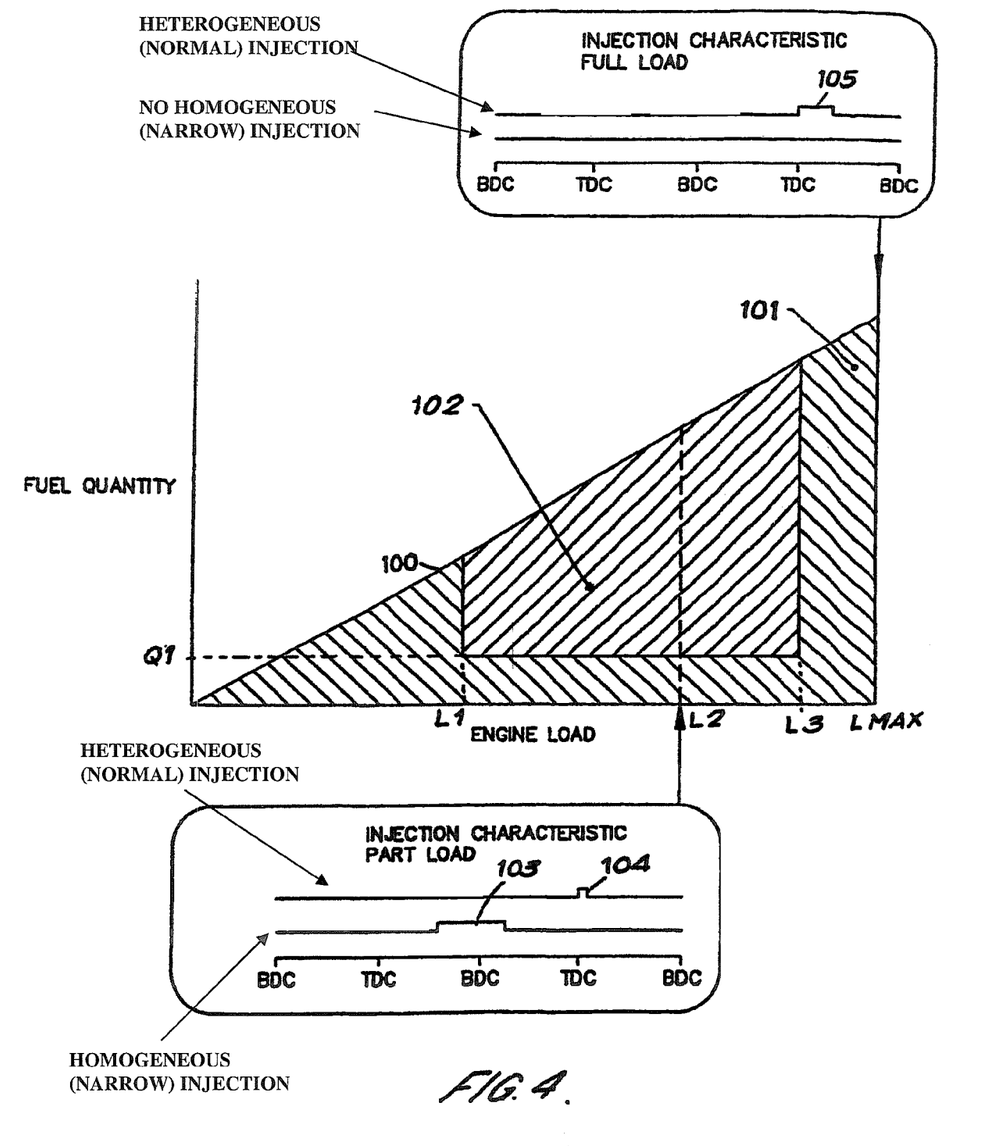
FIG. 4 is a graphical representation of fuel quantity against engine load showing the different modes of operation and including representations of the timing of the fuel injection at a different engine loads.

FIG. 4 represents the fuel quantity injected as a function of engine load as line 100. The shading beneath the line represents the manner in which the relative quantities of fuel are injected for any given load. Thus, region 101 represents a heterogeneous charge through orifices 29 while region 102 represents a homogeneous charge through clearance 18.

At low engine loads (below L1 in FIG. 4) fuel is injected only as a heterogeneous charge as it would otherwise be to lean to propagate combustion. At higher engine loads (between L3 and LMAX in FIG. 4) fuel is again injected only as a heterogeneous charge in order to avoid auto ignition. Also, it is always necessary to inject a certain quantity of fuel (Q1 in FIG. 4) as a heterogeneous charge as this is required as an ignition charge. Thus, the boundaries of region 102 showing the homogeneous charge are defined.

Between loads L1 and L3 the fuel is injected as a combination of heterogeneous and homogeneous charges with the injector operating in dual mode as described below. It will be appreciated that as engine load increases from L1 to L3 a progressively increasing proportion of the fuel is injected as a homogeneous charge.

The graph at the bottom of FIG. 4 shows a typical dual mode injection (engine load L2) at which the majority of fuel is injected as a homogeneous charge 103 for around 50° to 120° around bottom dead center while the ignition charge 104 is a heterogeneous charge injected for 2° to 10° at or around top dead center.

By contrast, the graph at the top of FIG. 4 shows the fuel injection at maximum engine load LMAX. This time, there is no homogeneous fuel charge, and all of the fuel is injected as a heterogeneous charge 105 for around 40° of crank angle at or after top dead center.

The operation of the dual mode fuel injector under part load conditions such as shown at L2 will now be described with particular reference to FIGS. 2A–2C.

Figure 2A:
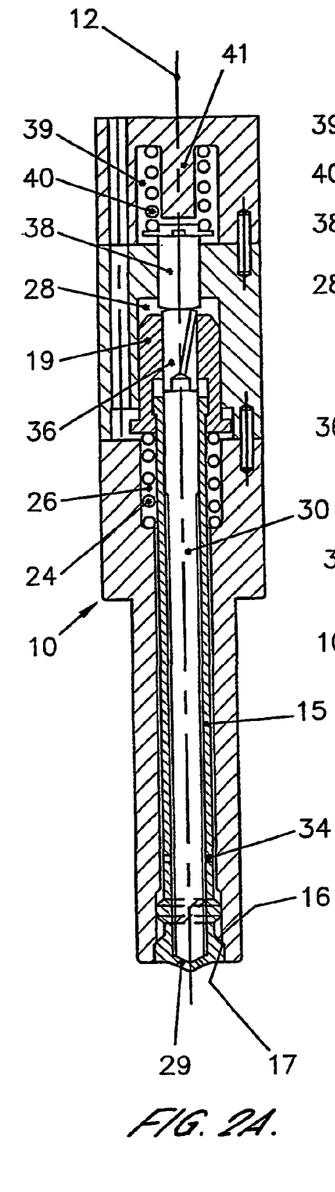
FIG. 2A is a cross-section of the fuel injector in the same position as shown in FIG. 1 in which both valve members are closed.
Figure 2B:
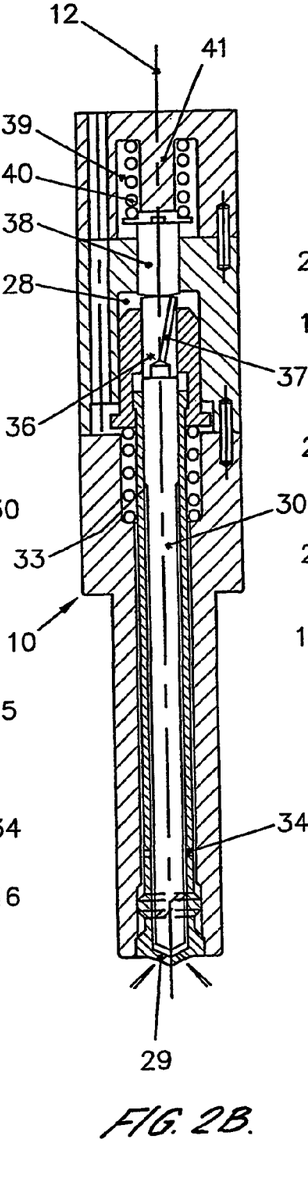
FIG. 2B is a view similar to FIG. 2A with the second valve member open.
Figure 2C:
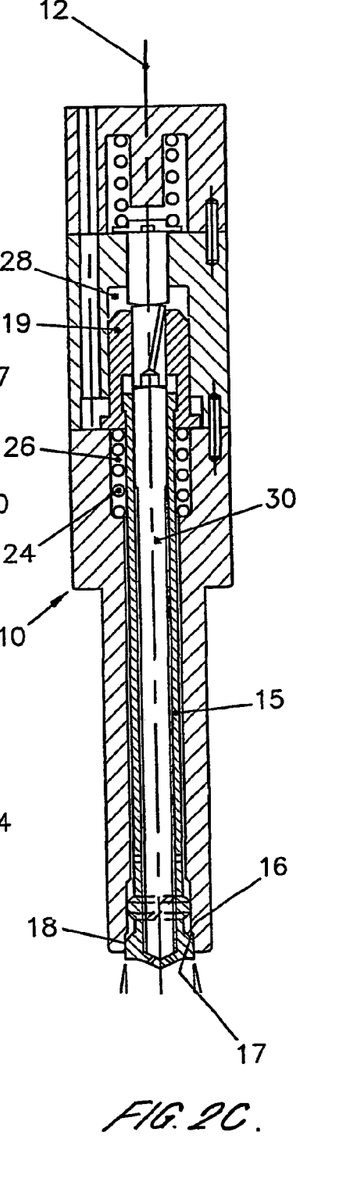
FIG. 2C is a view similar to FIGS. 2A and 2B with the first valve open.

FIG. 2A shows the injector with both valves closed. Under these conditions, the first valve member 15 is being biased in a proximal direction to maintain it closed. This is achieved by a combination of the biasing force provided by the first helical spring 24 together with the resultant fluid pressure in the second chamber 26 acting on the first piston 19. Acting in the opposite direction is the injection fluid pressure on the seating face 16. In this condition, in order to open the first valve member 15, a normally closed valve 43 controlling the flow through second supply line 27 is opened thus increasing the pressure in the second chamber 28 which acts on the proximal end of the piston and is designed to be sufficient to overcome the resultant closing force referred to above and move the first valve member 15 distally. This unseats the seating face 16 from the seat 17 allowing fuel to flow through the annular clearance 18 in a direction which is angled only very slightly to the axis 12 as shown in FIG. 2C.

In order to stop injection through the clearance 18, the normally closed valve 43 is closed at which point the pressure within the second chamber 28 is vented through an orifice 44 to a drain line 45 allowing the first valve member to be moved proximally.

This opening and closing operation is designed to take place immediately before, during and after bottom dead center and this injection stage is intended to last for between 50° and 120° of crank angle. Thus, a significant amount of fuel (generally two thirds to three quarters of the total fuel for a given cycle) is injected when the pressure in the cylinder is at its lowest, and is directed towards the piston, rather than towards the walls of the cylinder. As the piston moves upwardly, the swirling of the air within the cylinder causes considerable mixing of the fuel and air, so that by the time the piston approaches top dead center, fuel and air have formed a generally homogenous mixture. At or around top dead center, the second valve member 30 is opened as described below.

The second valve member is normally biased in a distal direction to maintain it closed. This biasing is provided by a combination of the force provided by the second helical spring 40, and the resultant fluid pressure acting on the second 36 and third 38 pistons. Against this, there is the pressure of the fuel to be injected acting on the shoulder 33. In order to open the second valve member 30, a second normally closed valve 46 in the third supply line 42 is opened thereby venting the pressure in the third chamber 39 to a drain line 47. When this pressure is removed, the pressure urging the second valve member in the proximal direction is sufficient to overcome the forces urging it in the opposite direction, so that it is moved proximally hence lifting the valve member 32 away from the orifices 29 as shown in FIG. 2B. Fuel is thus injected in the conventional direction through orifices 29. It is envisaged that the second valve member 30 will be opened with the first valve member 15 seated and the second chamber 28 vented to drain line 45, so that the second 36 and third 38 pistons will not separate. However, there is a risk that the second valve member 30 will separate from the second piston 36 given that the first chamber 26 is at injection pressure. This can be avoided by virtue of the bore 37 which equalises the pressure between second chamber 28 and the counterbore 37A at the end of the bore 37.

In order to close the second valve member 30, the normally closed valve 46 is again closed so that the third chamber 39 is again returned to injection pressure by virtue of the third supply line 42 which is now connected via orifice 48 to the source of pressurised fluid.

The second valve member 30 is arranged to be opened generally at or around top dead center and to be held open for a period of between 220 and 10° of crank angle. This injects a charge of fuel in a heterogeneous manner similar to conventional injection into a cylinder which already contains a homogenous mixture of fuel and air.

It should be noted that although second 27 and third 42 supply lines are shown connected to the source of pressurised fuel to be injected, this need not be the case and they may be connected to an independent supply of pressurised fluid at a different pressure to the fuel to be injected.

Under full load conditions LMAX, the narrow charge of fuel through the clearance 18 is not required. In this case, the first valve member is held seated and all of the fuel is injected through orifices 29 under the control of second valve member 30. The second control valve is kept open for up to 40° of crank angle when operating in this mode.

Figure 5:
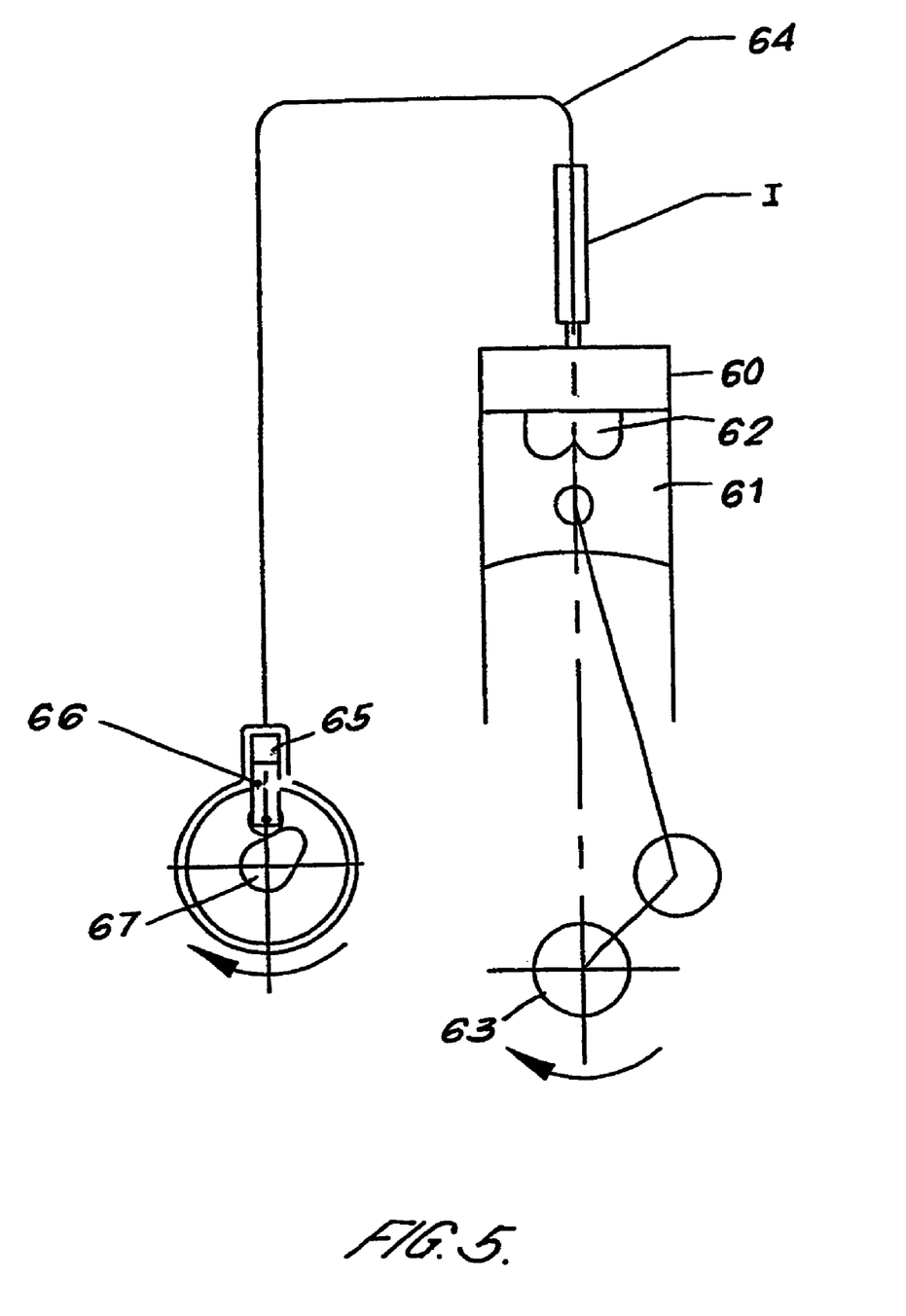
FIG. 5 is a schematic representation of a pumping arrangement to supply fuel to the fuel injector.

FIG. 5 is a schematic view of an arrangement by which fuel is fed to the injector. The injector I is arranged to inject fuel into a cylinder 60 as described above. A piston 61 with a bowl 62 reciprocates within the cylinder 60 to drive crankshaft 63. Fuel is supplied to the injector along fuel line 64 forced from a second cylinder 65 by reciprocating plunger 66. The plunger is reciprocated by means of a rotating cam 67.

Figure 6A:
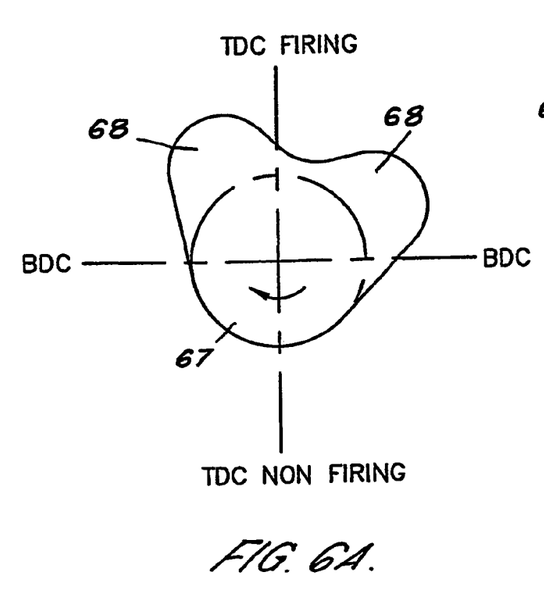
FIG. 6A shows a cam profile as would be required by a cam rotating conventionally at half engine speed.
Figure 6B:
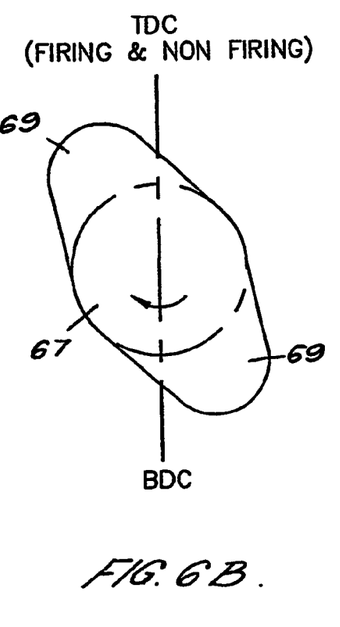
FIG. 6B is a view similar to FIG. 6A showing an alternative arrangment.

Conventionally, this cam will rotate at half the rotational speed of the crankshaft 63 such that two cam lobes 68 are required to provide the two injection pulses necessary for the dual mode fuel injection described above. It will be apparent from FIG. 6A, where two such lobes are illustrated, that there is a limit to how close together these two lobes can be formed. Therefore, an alternative configuration is shown in FIG. 6B. In this case, the two cam lobes 69 are positioned well away from one another. In this case, the cam 67 is rotated at twice the speed of the conventional cam, namely at a speed equal to the rotational speed of the crankshaft 63. Under these circumstances, the plunger 66 will be reciprocated twice as often as is necessary. This arrangement can therefore either be used to supply two fuel injectors I via suitable valving, or may be arranged by suitable valving to inject fuel only for every other pass of a cam lobe 69.

The invention claimed is:

1. A dual mode fuel injector having a main axis and comprising a first fuel path and a first axially movable valve member for controlling the injection of fuel from the first fuel path through a first orifice; and a second fuel path and a second axially movable valve member within the first valve member for controlling the injection of fuel from the second fuel path through a second orifice wherein the first and second valve members are actuatable independently of one another and the second valve member is arranged to open in a direction opposite to the direction of the opening of the first valve member; and wherein the first orifice is arranged to direct fuel at a narrow angle with respect to the axis and the second orifice is arranged to direct fuel at a larger angle with respect to the axis.

2. An injector according to claim 1 wherein the first valve is arranged to open in the direction of fuel injection.

3. An injector according to claim 1 wherein the first orifice is an annular orifice which surrounds the first valve member.

4. An injector according claim 1 wherein the opening of the first and/or second valve members is controllable independently of the pressure of the fuel to be injected.

5. An injector according to claim 1 wherein the first valve member is biased closed by a combination of a resilient element and fluid pressure acting on a piston mounted to the first valve member, the first valve member being arranged to be opened by the application of fluid pressure to the side of the first piston furthest from the first orifice; the second valve member being biased closed by a combination of pressure from a second resilient member and fluid pressure acting on a second piston and being arranged to be opened by the reduction of fluid pressure on the side of the second piston remote from the second orifice.

6. An injector according to claim 1 wherein the narrow angle is less than 25° with respect to the axis.

7. An injector according to claim 1 wherein the orifice through which the fuel is injected at a larger angle is a plurality of holes arranged in a conical configuration about the axis.

8. An injection according to claim 1 wherein the orifice through which the fuel is injected at a larger angle is one hole directed away from the axis, or more than one hole directed in substantially the same direction away from the axis.

9. An engine management system for an engine having a plurality of pistons each having a piston bowl and being arranged to reciprocate in a respective cylinder, the system comprising a respective dual mode fuel injector, according to claim 1 associated with each piston, and a control system, the control system arranged to operate such that when a piston is towards the bottom of its stroke, a first charge of fuel is injected towards the piston bowl, and when the piston is towards the top of its stroke, a second charge of fuel is injected into the cylinder at a wider angle than the first charge of fuel.

10. An engine management system according to claim 9, wherein fuel is supplied from a supply cylinder from which it is displaced by a plunger which is arranged to reciprocate within the supply cylinder, the plunger being displaced by a camshaft.

11. An engine management system according to claim 10, wherein the camshaft is provided with two cam lobes positioned away from one another, and wherein the control system is arranged to open the first and second valve members only for every other rotation of the camshaft.

12. An engine management system according to claim 11, wherein a single dual lobe cam is used, with a suitable control valve, to inject fuel alternatively through two different nozzles.

13. An engine management system according to claim 12 wherein the control system is arranged such that the first and/or second valve members are only opened for a selected portion of the cam profile.

14. An engine management system according to claim 9 wherein the control system is arranged to inject the first charge of fuel for a duration of between 45° and 225°, of crank angle.

15. An engine management system according to claim 9 wherein the control system is arranged to inject the second charge of fuel for a duration of between 2° and 10° of crank angle.

16. An engine having a plurality of pistons each having a piston bowl and being arranged to reciprocate in a respective cylinder, the engine having an engine management system according to claim 9.

17. A method of injecting fuel into the cylinder of an internal combustion engine having a fuel injector according to claim 1 in which a piston with a piston bowl is arranged to reciprocate, the method comprising the steps of injecting one charge of fuel towards the piston bowl when the piston is towards the bottom of its stroke and injecting another charge of fuel at a wider angle into the cylinder when the piston is towards the top it its stroke.

18. A method according to claim 17, wherein the one charge represents the majority of fuel injected during the cycle.

19. A method according to claim 17, wherein the another charge represents the majority of fuel injected during the cycle.

20. An injector having a main axis and comprising;
an engine management system for an engine having a plurality of pistons each having a piston bowl and being arranged to reciprocate in a respective cylinder, the system comprising a respective dual mode fuel injector associated with each piston, and a control system, the control system arranged to operate such that when a piston is towards the bottom of its stroke, a first charge of fuel is injected towards the piston bowl, and when the piston is towards the top of its stroke, a second charge of fuel is injected into the cylinder at a wider angle than the first charge of fuel, wherein the dual mode fuel injector has a main axis, a first fuel path and a first axially movable valve member for controlling the injection of fuel from the first fuel path through a first orifice; a second fuel path and a second axially movable valve member within the first valve member for controlling the injection of fuel from the second fuel path through a second orifice wherein the first and second valve members are actuatable independently of one another and the second valve member is arranged to open in a direction opposite to the direction of the opening of the first valve member; and wherein one orifice is arranged to direct fuel at a narrow angle with respect to the axis and the other orifice is arranged to direct fuel at a larger angle with respect to the axis.

* * * * *